United States Patent [19]

Janitsch et al.

[11] 3,948,383

[45] Apr. 6, 1976

[54] DOUBLE BELT AIR PRESSURIZED ELEVATOR FOR BULK MATERIAL

[75] Inventors: Anthony D. Janitsch, Belleville; Claude Morissette, Montreal, both of Canada

[73] Assignee: Allis-Chalmers Corporation, Milwaukee, Wis.

[22] Filed: Apr. 2, 1975

[21] Appl. No.: 564,434

[52] U.S. Cl. ................................ 198/165; 198/184
[51] Int. Cl.² ........................................ B65G 15/18
[58] Field of Search ............ 198/162, 165, 184, 192

[56] References Cited
UNITED STATES PATENTS

| | | | |
|---|---|---|---|
| 3,260,354 | 7/1966 | Chiddister et al. | 198/184 |
| 3,762,534 | 10/1973 | Beresinsky | 198/165 |

FOREIGN PATENTS OR APPLICATIONS

| | | | |
|---|---|---|---|
| 547,416 | 8/1932 | Germany | 198/165 |

Primary Examiner—Evon C. Blunk
Assistant Examiner—Richard K. Thomson
Attorney, Agent, or Firm—Charles L. Schwab

[57] ABSTRACT

In a bulk material handling apparatus, a pair of fluid impervious flexible endless belts are arranged about drive and idler pulleys to provide a material receiving run of one belt, a substantially vertical elevator or lift run or elevating section where the belts are in face-to-face contact for receiving the material therebetween; and an upper material delivery run where the material is discharged at a different level. In the elevating section, fluid pressure means are provided to effectively cause engagement of the edge portions of the belts with one another in order to eliminate spillage of the material being elevated and also in the elevating section fluid pressure means are provided to urge the remainder of the belts toward one another. These means involve the use of fluid pressure in various ways.

5 Claims, 8 Drawing Figures

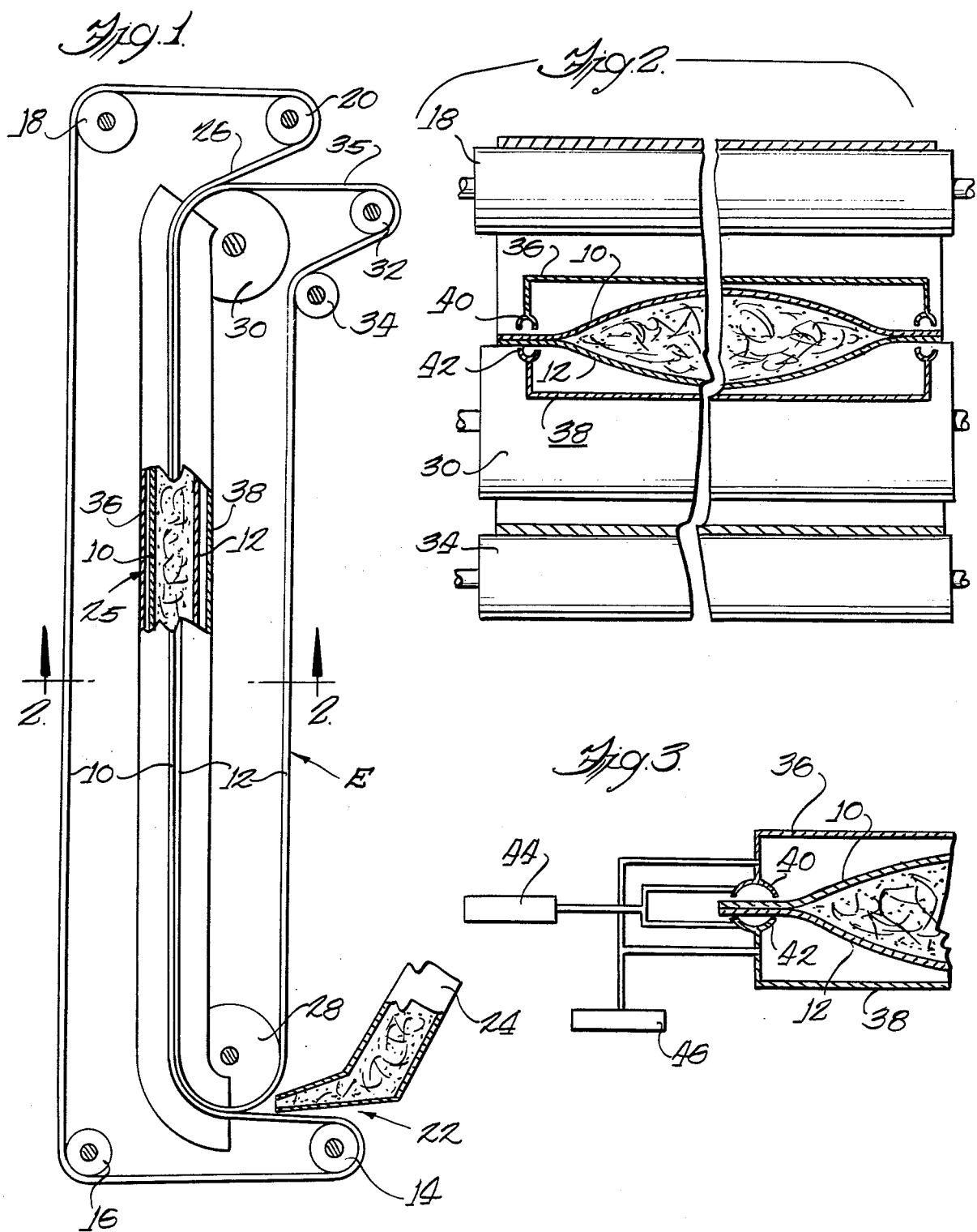

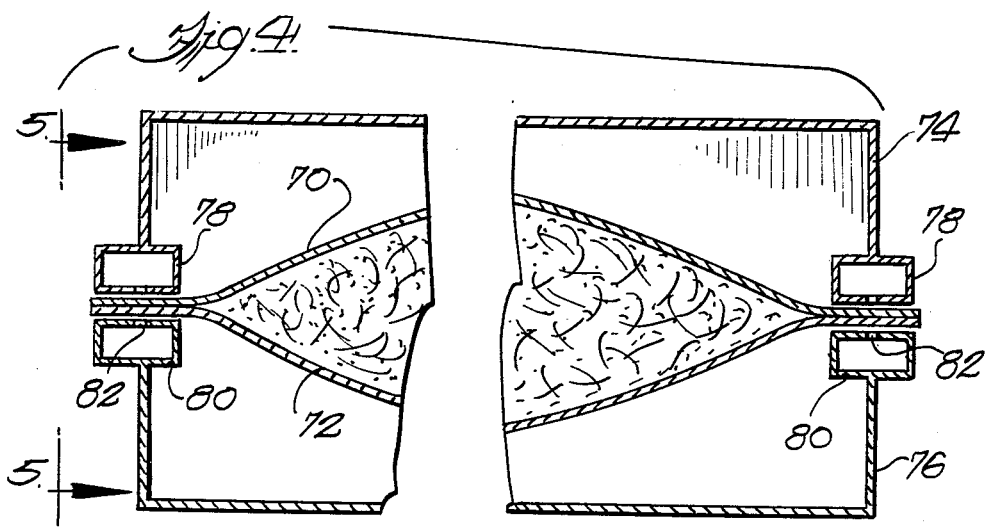
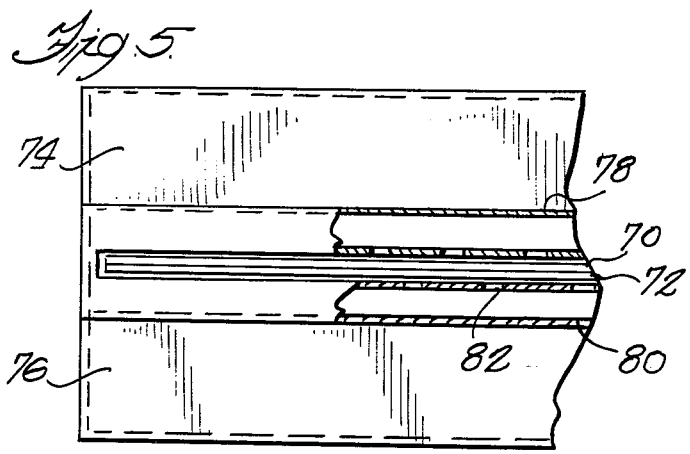
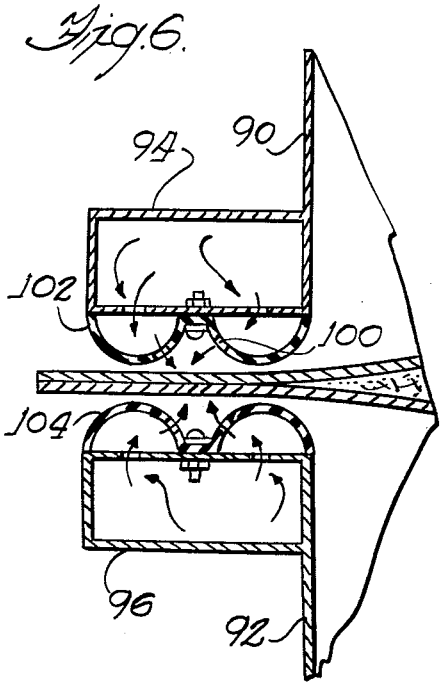
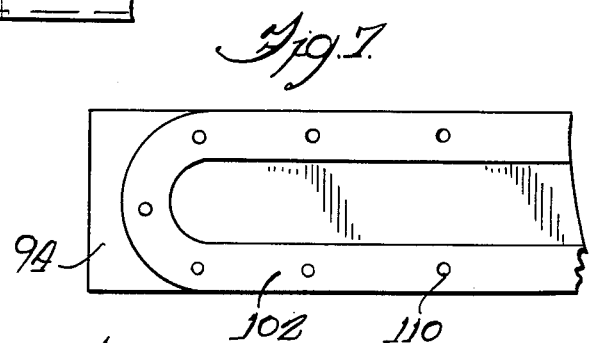
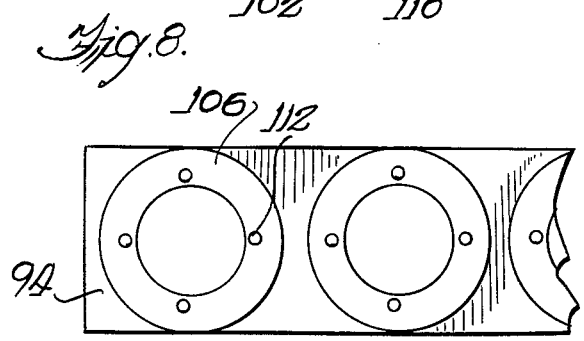

DOUBLE BELT AIR PRESSURIZED ELEVATOR FOR BULK MATERIAL

BACKGROUND OF THE INVENTION

It is well known to elevate bulk materials by entrapping the material between vertically oriented flights of belt conveyors which face one another. Generally it is known to trap the material in the elevating section between the belts by utilizing a compressible foam material placed to engage the rear faces of the belts. The compressibility of the foam material may be chosen to vary from edgge to edge and when less compressible adjacent the edges of the belts provides a force tending to urge the edges into sealing engagement with one another. In such arrangement, the density of the foam at the center of the belts is less than that at the edges. This arrangement has not proved entirely satisfactory.

It is also known to provide means whereby a fluid pressure is applied to the rear faces of the belts in the elevating section (see recently issued U.S. Pat. No. 3,762,534); however, this may not be entirely satisfactory because it has been found that unless higher pressures are applied to the edges to maintain them in contact with one another, material can readily escape at the belt edges.

According to this invention, there is provided a pair of endless, flexible, fluid impervious belts which have an elevating section in which the belts are in face-to-face relationship for transferring bulk material, such as relatively finely divided and granular material, between two levels. Thus, "when elevating section" is used, it is to apply equally to that part of the apparatus for transferring material from one level to another and higher level, or for transferring material from the higher level to the lower level. The elevating section of the apparatus can be substantially vertically arranged or at some inclination to the horizontal within the purview of the invention.

In any event, belt plenum chambers are arranged adjacent the backs of the belts in the elevating section, so that fluid pressure, preferably air, can be supplied to the belts in this section to urge them into engagement with the material therebetween. Also, to insure retention and substantially eliminate spillage from the edges, additional means, such as edge plenums, coextensive with the belt plenums, are provided. Fluid at a higher pressure than supplied to the belt plenums is supplied to these edge plenums. Thus forces are applied to the edges of the blets to urge them into engagement with one another and to maintain them in contact with one another.

THE DRAWINGS

FIG. 1 is a side elevation of a belt elevator constructed according to this invention and illustrating one embodiment of the fluid pressure arrangement of this invention;

FIG. 2 is a sectional view taken on line 2—2 of FIG. 1;

FIG. 3 is an enlarged sectional view of one form of the plenum arrangement of this invention;

FIG. 4 is a sectional view, similar to FIG. 2, illustrating a second embodiment of the invention;

FIG. 5 is a longitudinal sectional view taken along line 5—5 of FIG. 4 illustrating details of the second embodiment of the invention;

FIG. 6 is a sectional view, similar to FIG. 2, illustrating a third embodiment of this invention;

FIGS. 7 and 8 are plan views of parts of alternative forms of the third embodiment of this invention.

DETAILED DESCRIPTION

FIGS. 1 to 3 illustrate a pair of endless, flexible, fluid impervious belts 10 and 12 which are in face-to-face relationship in an elevating section E of the apparatus. The belt 10 is entrained over pulleys 14, 16, 18 and 20, and the pulleys 14 and 16 being spaced from each other at the lower level, and generally horizontally positioned, while the pulleys 18 and 20 are generally horizontally positioned and spaced from each other at the upper level. One or more of these pulleys may be driving pulleys. The belt 10 has a substantially C-shaped configuration forming a substantially horizontal loading section 22 to receive bulk material from a chute 24 or similar device, a vertical elevating portion 25, and an upper portion which is angularly disposed to form a discharge section 26.

The belt 12 is entrained over pulleys 28, 30, 32, and 34, one or more of which may be driving pulleys. The pulleys 28 and 30 are large pulleys which deflect the belt 12 into engagement with the belt 10, while the pulleys 30 and 32 are horizontally spaced, so that a belt discharge section 35 is formed. The pulley 34 is a snub pulley to maintain the belt 12 taut.

The driving pulleys are arranged to drive the belts at the same speed.

Belt plenum devices 36, 38 having edge plenums 40 and 42 are positioned to enclose the rear faces of the belts 10 and 12, respectively, and are coextensive with each other and with the belts in their contacting portions, the elevating section E, as is illustrated in FIG. 1.

The belt plenums 36 and 38 are connected, as illustrated in FIG. 3, to a source of pressurized fluid 44, preferably air, such that the pressure in each device is substantially the same. The edge plenums 40 and 42 are generally elongated chambers also coextensive with the elevating section E of the belts and are likewise connected to a source of pressurized fluid 46, preferably air, maintained at a higher pressure than the source 44. It is thus apparent that the edge plenums are supplied with pressurized fluid at a higher pressure than the belt plenums. While air is preferred as the fluid, it is apparent that gaseous fluids other than air can be used without departing from the spirit of the invention. Thus where the word air is used herein, it is intended to encompass such other gaseous fluids.

Because the edge plenums 40 and 42 are supplied with air at a pressure higher than that supplied to the plenum devices 36 and 38, a force of greater magnitude is applied to the edges than that applied to the central portions of the belts and the edges of the belts are effectively maintained in intimate engagement with one another to substantially eliminate or materially reduce bulk material spillage during its elevation or transfer from one level to another. It is to be understood that when used herein, elevation of material can mean being conveyed upwardly or downwardly, either substantially vertically or at some angle with respect to the horizontal. The edge plenums also are effective in maintaining the belt plenums 36, 38 under pressure.

The air under pressure in the plenum devices 36 and 38 urge the central portions of the belts toward one another and the bulk material being transported thereby, but with a force less than that urging the belt edges into engagement with one another.

In a typical arrangement, the elevating section of the apparatus is 60 feet in length; the belts are 42 inches in width; the belt plenums are supplied with air at a pressure of one pound per square inch while the edge plenums are supplied with air at a pressure of 3 pounds per square inch. Bulk material, such as crushed rock, is loaded at a rate of 3600 tons/hour and is effectively transported vertically without substantial spillage from the belts.

FIGS. 4 and 5, illustrating a second embodiment of this invention differing primarily from the first embodiment in the construction of the edge plenums, and depict, in section, a pair of belt conveyors 70, 72 and belt plenums 74, 76 coextensive with the elevating section of the conveyor, which is essentially like that illustrated in FIG. 1. Also shown are edge headers 78, 80 coextensive with the belt plenums. Each edge header is provided with spaced openings 82 along their lengths for the passage of pressurized air onto the edges of the belts 70, 72. Each edge header is supplied from a suitable source with pressurized air at a pressure above that which is supplied to the plenums 74 and 76. Pressurized air from the openings 82 impinges on the belt edges and forces the edges into engagement with one another. Also, discharge of the air onto the belt edges reduces leakage from the belt plenums 74 and 76. The openings 82 may be elongated in the direction of length of the headers or of other suitable shape or angled with respect to the belt within the purview of this invention.

FIGS. 6, 7 and 8 illustrate a third embodiment of this invention in which there are belt plenum chambers 90 and 92 coextensive with the conveyor belts 94 and 96, along their contacting faces in the elevating section, edge headers 98 and 100 coextensive with the belt plenums and fluid impervious flexible membrane means 102, 104, (FIG. 6) or 106 (FIG. 8) having openings 110 or 112, respectively, for discharging pressurized air against the edges of the belts 94, 96.

The flexible membranes can be of rubber or other flexible material secured to the headers as by being connected at the edges and center. In the FIG. 7 embodiment, a substantially continuous membrane is used and is connected to the respective header, so as to have a long oval shape, while in the FIG. 8 embodiment the membrane is separated into smaller, generally circular segments. It is to be understood that other configurations can be used without departing from the spirit of the invention.

In the figures of the drawing, the membrane is centrally fastened by bolt, nut and washer combination. In this embodiment, as in other embodiments, the pressurized air is supplied to the headers, and then to the membrane and onto the edges of the belts at a higher pressure than that supplied to the belt plenums. Thus the function of this embodiment is substantially the same as that described with respect to the first embodiment.

The embodiments of the invention in which an exclusive property or privilege is claimed are defined as follows:

1. A conveyor system comprising a pair of flexible, fluid impervious endless belts, driven at the same speed, each belt having a portion in face-to-face relationship to the other to convey a material therebetween and to define a working zone and elevating section, the improvement comprising:

means urging the said belts toward one another in said working zone and elevating section to thereby substantially eliminate spillage of material from between said belts, said urging means comprising belt plenum chambers associated with the back surfaces of said belts in said working zone, and means for supplying fluid under pressure to said belt plenum chambers to urge said belts toward one another, and edge plenum chambers adjacent the back edges of said belts coextensive with said belt plenum chambers, and means to supply fluid under pressure to said edge plenum chambers to urge the edges of said belts in said working zone into contact with one another.

2. A conveyor system as cited in claim 1, wherein said fluid which is supplied to said edge plenum chambers is at a higher pressure than said fluid which is supplied to said belt plenum chambers.

3. A conveyor as recited in claim 2 wherein said edge plenum chambers are provided with spaced openings for discharge of fluid therefrom onto the adjacent back edge of the belt.

4. A conveyor as recited in claim 3 wherein each said edge plenum chambers are provided with a flexible membrane each having openings therethrough for the discharge of fluid therefrom onto the adjacent back edge of the belt.

5. A conveyor system having a pair of flexible fluid impervious endless belts, driven at the same speed, with an elevating portion in which said belts are in face-to-face relationship in order to elevate bulk material therebetween and defining an elevating section, the improvement which comprises, opposed belt plenum chambers positioned to face the back of each belt in said elevating sections;

means to supply air under a first pressure to said belt plenum chambers to urge the belts toward one another in said elevating section;

edge plenum chambers adjacent the back edges of said belts coextensive with said back plenum chambers; and means to supply air under a second and higher pressure to said edge plenum chambers to urge the edges of the belts into engagement with one another in said elevating section.

* * * * *